(12) United States Patent
Li et al.

(10) Patent No.: US 10,136,431 B2
(45) Date of Patent: Nov. 20, 2018

(54) SIGNALING FOR FAST RELAYING

(71) Applicant: QUALCOMM Incorporated, San Diego, CA (US)

(72) Inventors: Chong Li, Weehawken, NJ (US); Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 15/377,040

(22) Filed: Dec. 13, 2016

(65) Prior Publication Data

US 2018/0014296 A1 Jan. 11, 2018

Related U.S. Application Data

(60) Provisional application No. 62/358,516, filed on Jul. 5, 2016.

(51) Int. Cl.

| | | |
|---|---|---|
| H04W 72/04 | (2009.01) | |
| H04W 72/10 | (2009.01) | |
| H04L 1/08 | (2006.01) | |
| H04L 5/00 | (2006.01) | |
| H04B 7/155 | (2006.01) | |
| H04B 7/26 | (2006.01) | |

(Continued)

(52) U.S. Cl.
CPC ........ *H04W 72/0446* (2013.01); *H04B 7/155* (2013.01); *H04B 7/2606* (2013.01); *H04L 1/08* (2013.01); *H04L 5/0055* (2013.01); *H04W 72/042* (2013.01); *H04W 72/10* (2013.01); *H04W 84/047* (2013.01); *H04W 88/04* (2013.01)

(58) Field of Classification Search
CPC ............. H04W 72/0446; H04W 72/10; H04W 84/047; H04W 88/04; H04L 1/08; H04L 5/0055

See application file for complete search history.

(56) References Cited

U.S. PATENT DOCUMENTS

| | | |
|---|---|---|
| 8,634,343 B2 | 1/2014 | Hart et al. |
| 9,178,603 B2 | 11/2015 | Nagaraja |

(Continued)

FOREIGN PATENT DOCUMENTS

WO   WO-2010122419 A2   10/2010

OTHER PUBLICATIONS

Ngo B., et al., "Avoiding Bottlenecks Due to Traffic Aggregation at Relay Nodes in Multi-hop Wireless Networks", IEEE, Institute for Telecommunications Research, University of South Australia, 2005, pp. 1-5.

(Continued)

*Primary Examiner* — Gbemileke J Onamuti
(74) *Attorney, Agent, or Firm* — Clint R. Morin; Holland & Hart

(57) ABSTRACT

Methods, systems, and devices for wireless communication are described. A relay wireless node may receive, during a first transmit time interval (TTI), a data message to be forwarded to a wireless node. The relay wireless node may forward the data message to the wireless node during the first TTI. The relay wireless node may receive, during a second TTI, a feedback message from the wireless node. The relay wireless node may retransmit the feedback message during the second TTI.

30 Claims, 16 Drawing Sheets

(51) Int. Cl.
*H04W 84/04* (2009.01)
*H04W 88/04* (2009.01)

(56) References Cited

U.S. PATENT DOCUMENTS

| | | | | |
|---|---|---|---|---|
| 2009/0254790 | A1* | 10/2009 | Pi | H04L 1/1854 |
| | | | | 714/749 |
| 2011/0167326 | A1 | 7/2011 | Kuri et al. | |
| 2011/0267991 | A1 | 11/2011 | Damnjanovic et al. | |
| 2014/0029506 | A1* | 1/2014 | Sahin | H04J 11/0053 |
| | | | | 370/315 |
| 2014/0044028 | A1* | 2/2014 | Nammi | H04B 7/0417 |
| | | | | 370/311 |
| 2016/0234800 | A1* | 8/2016 | Jung | H04W 72/04 |
| | | | | 370/320 |
| 2018/0035329 | A1* | 2/2018 | Futaki | H04W 28/06 |

OTHER PUBLICATIONS

ISA/EP, International Search Report and Written Opinion of the International Searching Authority, Int'l Application No. PCT/US2017/032586, dated Aug. 23, 2017, European Patent Office, Rijswijk, NL, 15 pgs.

Nokia et al., "Basic Frame Structure Principles for 5G New Radio," 3GPP TSG-RAN WG1 Meeting #84bis, R1-162893, Busan, Korea, Apr. 11-15, 2016, 7 pgs., XP051079734, 3rd Generation Partnership Project.

\* cited by examiner

SIGNALING FOR FAST RELAYING

CROSS REFERENCES

The present Application for Patent claims priority to U.S. Provisional Patent Application No. 62/358,516 by Li, et al., entitled "Signaling For Fast Relaying," filed Jul. 5, 2016, assigned to the assignee hereof.

BACKGROUND

The following relates generally to wireless communication, and more specifically to signaling for fast relaying.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems may include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Certain wireless communications may be associated with priority communications. For example, certain UEs and base stations may perform mission critical (MiCr) communications in various circumstances, e.g., emergency response communications, certain sensor wireless links, etc. These priority communications may be associated with low latency and high reliability requirements. The inherent timing between transmission opportunities (e.g., transmit time interval (TTI)) configured for certain wireless communications systems may introduce problems for priority communications. For example, the timing parameters used in a priority communication between a base station and a UE may not support retransmission of the priority transmission when the link between the base station and the UE is suddenly lost. Thus, occasional blocking of wireless links may lead to failure to meet various MiCr communication requirements, including the latency and high-reliability requirements.

SUMMARY

The described techniques relate to improved methods, systems, devices, or apparatuses that support signaling for fast relaying. Generally, the described techniques provide for creating path diversity for mission critical (MiCr) communications by dynamically selecting relay nodes for a user equipment (UE) whose communications with a base station have been interrupted or blocked, etc. Blocked or "failure" UEs, may have both uplink and/or downlink communications blocked. In these situations, a relay node may receive and forward feedback information for the failure UE on one transmission time interval (TTI), e.g., during the same uplink subframe, such that the low latency feature of MiCr communications is satisfied. For example, a base station may transmit data messages to UEs (e.g., wireless nodes) within its coverage area. The base station may receive feedback messages from certain UEs, but not necessarily from a failure UE. The base station may identify feedback resources and then transmit an assignment to one or more relay UEs, requesting the relay UEs to forward one or more data messages to the failure UE. The base station may also identify resources to be used by the relay UE(s) for retransmitting feedback message(s) from the failure UE. Thus, in response to receiving the data messages either from the base station or as forwarded by the one or more relay UEs, the failure UE may broadcast a feedback message to the relay UE in a TTI and the relay UE may retransmit the feedback to the base station in the same TTI. A similar exchange may occur between a failure UE and a base station and one or more relay UEs when the failure UE fails to receive a feedback message from a base station in response to an uplink communication from the failure UE.

A method of wireless communication is described. The method may include receiving, during a first TTI, a data message to be forwarded to a wireless node, forwarding the data message to the wireless node during the first TTI, receiving, during a second TTI, a feedback message from the wireless node, and retransmitting the feedback message during the second TTI.

An apparatus for wireless communication is described. The apparatus may include means for receiving, during a first TTI, a data message to be forwarded to a wireless node, means for forwarding the data message to the wireless node during the first TTI, means for receiving, during a second TTI, a feedback message from the wireless node, and means for retransmitting the feedback message during the second TTI.

Another apparatus for wireless communication is described. The apparatus may include a processor, memory in electronic communication with the processor, and instructions stored in the memory. The instructions may be operable to cause the processor to receive, during a first TTI, a data message to be forwarded to a wireless node, forward the data message to the wireless node during the first TTI, receive, during a second TTI, a feedback message from the wireless node, and retransmit the feedback message during the second TTI.

A non-transitory computer readable medium for wireless communication is described. The non-transitory computer-readable medium may include instructions operable to cause a processor to receive, during a first TTI, a data message to be forwarded to a wireless node, forward the data message to the wireless node during the first TTI, receive, during a second TTI, a feedback message from the wireless node, and retransmit the feedback message during the second TTI.

Some examples of the method, apparatus, and non-transitory computer-readable medium described above may further include processes, features, means, or instructions for receiving, during the first TTI, an assignment of data resources for forwarding the data message to the wireless node.

Some examples of the method, apparatus, and non-transitory computer-readable medium described above may further include processes, features, means, or instructions for receiving, during the second TTI, a first assignment of feedback resources for receiving the feedback message from the wireless node and a second assignment of feedback resources for retransmitting the feedback message.

In some examples of the method, apparatus, and non-transitory computer-readable medium described above, the first TTI may be a downlink TTI and the second TTI may be an uplink TTI.

In some examples of the method, apparatus, and non-transitory computer-readable medium described above, the first TTI may be an uplink TTI and the second TTI may be a downlink TTI.

In some examples of the method, apparatus, and non-transitory computer-readable medium described above, the feedback message may be responsive to the data message.

In some examples of the method, apparatus, and non-transitory computer-readable medium described above, the second TTI includes a predefined number of symbol periods in between receiving the feedback message and retransmitting the feedback message.

Some examples of the method, apparatus, and non-transitory computer-readable medium described above may further include processes, features, means, or instructions for receiving, on a physical downlink control channel (PDCCH), an assignment of feedback resources for receiving the feedback message from the wireless node and for retransmitting the feedback message.

Some examples of the method, apparatus, and non-transitory computer-readable medium described above may further include processes, features, means, or instructions for receiving the assignment of feedback resources occurs during a control portion of the second TTI.

Some examples of the method, apparatus, and non-transitory computer-readable medium described above may further include processes, features, means, or instructions for receiving the assignment of feedback resources occurs during a control portion of a TTI other than the second TTI.

In some examples of the method, apparatus, and non-transitory computer-readable medium described above, the wireless node may be associated with a priority communication.

In some examples of the method, apparatus, and non-transitory computer-readable medium described above, the feedback message comprises an acknowledgement/negative acknowledgement (ACK/NACK) message.

A method of wireless communication is described. The method may include transmitting, to a relay wireless node during a first TTI, a data message to be forwarded by the relay wireless node to a destination wireless node during the first TTI, transmitting, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI, and receiving the feedback message from the relay wireless node during the second TTI.

An apparatus for wireless communication is described. The apparatus may include means for transmitting, to a relay wireless node during a first TTI, a data message to be forwarded by the relay wireless node to a destination wireless node during the first TTI, means for transmitting, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI, and means for receiving the feedback message from the relay wireless node during the second TTI.

Another apparatus for wireless communication is described. The apparatus may include a processor, memory in electronic communication with the processor, and instructions stored in the memory. The instructions may be operable to cause the processor to transmit, to a relay wireless node during a first TTI, a data message to be forwarded by the relay wireless node to a destination wireless node during the first TTI, transmit, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI, and receive the feedback message from the relay wireless node during the second TTI.

A non-transitory computer readable medium for wireless communication is described. The non-transitory computer-readable medium may include instructions operable to cause a processor to transmit, to a relay wireless node during a first TTI, a data message to be forwarded by the relay wireless node to a destination wireless node during the first TTI, transmit, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI, and receive the feedback message from the relay wireless node during the second TTI.

Some examples of the method, apparatus, and non-transitory computer-readable medium described above may further include processes, features, means, or instructions for transmitting, to an additional relay wireless node, the first assignment of feedback resources to allow the additional relay wireless node to receive the feedback message from the destination wireless node during the second TTI and the second assignment of feedback resources to allow the additional relay wireless node to retransmit the feedback message during the second TTI. Some examples of the method, apparatus, and non-transitory computer-readable medium described above may further include processes, features, means, or instructions for receiving the feedback message from the additional relay wireless node during the second TTI.

Some examples of the method, apparatus, and non-transitory computer-readable medium described above may further include processes, features, means, or instructions for selecting the relay wireless node for transmission of the data message to be forwarded to the destination wireless node during the first TTI based at least in part on successful receipt of a previous feedback message received from the relay wireless node.

Some examples of the method, apparatus, and non-transitory computer-readable medium described above may further include processes, features, means, or instructions for selecting the relay wireless node for transmission of the data message to be forwarded to the destination wireless node during the first TTI based at least in part on a geometry of a wireless network.

Some examples of the method, apparatus, and non-transitory computer-readable medium described above may further include processes, features, means, or instructions for transmitting, during the first TTI, an assignment of data resources for forwarding the data message to the destination wireless node.

In some examples of the method, apparatus, and non-transitory computer-readable medium described above, the first TTI may be a downlink TTI and the second TTI may be an uplink TTI.

In some examples of the method, apparatus, and non-transitory computer-readable medium described above, the first TTI may be an uplink TTI and the second TTI may be a downlink TTI.

In some examples of the method, apparatus, and non-transitory computer-readable medium described above, the feedback message may be responsive to the data message.

In some examples of the method, apparatus, and non-transitory computer-readable medium described above, transmitting the first assignment of feedback resources and the second assignment of feedback resources comprises: transmitting the first assignment of feedback resources and the second assignment of feedback resources on a PDCCH.

Some examples of the method, apparatus, and non-transitory computer-readable medium described above may further include processes, features, means, or instructions for transmitting the first assignment of feedback resources and the second assignment of feedback resources occurs during a control portion of the second TTI.

Some examples of the method, apparatus, and non-transitory computer-readable medium described above may further include processes, features, means, or instructions for transmitting the first assignment of feedback resources and the second assignment of feedback resources occurs during a control portion of a TTI other than the second TTI.

In some examples of the method, apparatus, and non-transitory computer-readable medium described above, the wireless node may be associated with a priority communication.

In some examples of the method, apparatus, and non-transitory computer-readable medium described above, the feedback message comprises an ACK/NACK message.

A method of wireless communication is described. The method may include receiving a data message forwarded from a source wireless node via a relay wireless node during a first TTI and broadcasting a feedback message during a second TTI in response to the data message such that one or both of the source wireless node and the relay wireless node receives the feedback message.

An apparatus for wireless communication is described. The apparatus may include means for receiving a data message forwarded from a source wireless node via a relay wireless node during a first TTI and means for broadcasting a feedback message during a second TTI in response to the data message such that one or both of the source wireless node and the relay wireless node receives the feedback message.

Another apparatus for wireless communication is described. The apparatus may include a processor, memory in electronic communication with the processor, and instructions stored in the memory. The instructions may be operable to cause the processor to receive a data message forwarded from a source wireless node via a relay wireless node during a first TTI and broadcast a feedback message during a second TTI in response to the data message such that one or both of the source wireless node and the relay wireless node receives the feedback message.

A non-transitory computer readable medium for wireless communication is described. The non-transitory computer-readable medium may include instructions operable to cause a processor to receive a data message forwarded from a source wireless node via a relay wireless node during a first TTI and broadcast a feedback message during a second TTI in response to the data message such that one or both of the source wireless node and the relay wireless node receives the feedback message.

Some examples of the method, apparatus, and non-transitory computer-readable medium described above may further include processes, features, means, or instructions for receiving an indication that the feedback message may be to be broadcasted.

DETAILED DESCRIPTION

Figure 1:
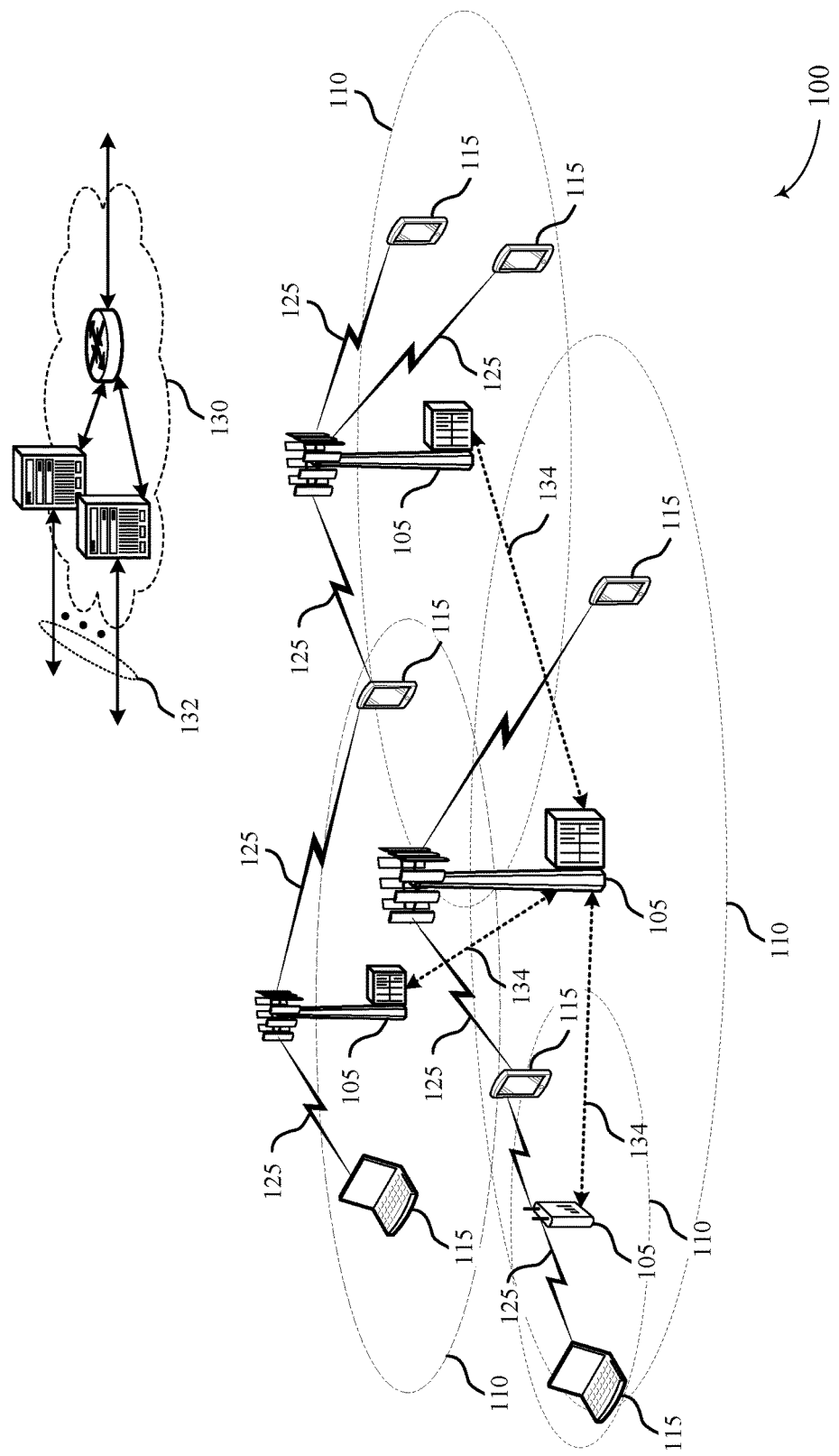
FIG. 1 illustrates an example of a system for wireless communication that supports signaling for fast relaying in accordance with aspects of the present disclosure.

Certain wireless communication systems may use a frame structure that includes timing parameters that may not account for communication losses during mission critical (MiCr) communications. For example, MiCr wireless communications may be associated with high priority communications with predefined low latency and high reliability requirements. While such timing parameters may support conventional MiCr communications, the latency and/or reliability requirements may not be supported when there is a link failure between the base station and user equipment (UE).

Aspects of the disclosure are initially described in the context of a wireless communications system. The wireless communications system may include a base station in communication with multiple UEs. At least one UE may be associated with priority communications, e.g., MiCr communications. The base station may transmit data to the priority UE, e.g., MiCr data messages. The base station may expect a feedback message (e.g., an acknowledgement/negative acknowledgement (ACK/NACK) message) from the priority UE, but may not receive the feedback message due to a link failure. The base station may maintain a network geometry indicative of which UEs are within its coverage area, where such UEs are located, etc. The network geometry may also provide an indication of at least one other UE that is located near the priority UE and that may therefore act as a relay UE to the priority or failure UE. The base station may have received feedback messages from the relay UE recently, e.g., within a transmission time interval (TTI), within a subframe, within a frame, etc. The base station may select the relay UE to retransmit information between the base station and the priority or failure UE.

The base station may identify resources associated with using the relay UE to retransmit the information, e.g., data message resources, feedback message resources, etc. The base station may transmit the data message to the relay UE during a TTI. The base station may transmit an assignment of feedback resources during a second TTI. The feedback resources may provide for the relay UE to receive a feedback message from the priority or failure UE and to retransmit the feedback message to the base station during the same TTI. The base station may receive the feedback message from the relay wireless node during the second TTI.

The base station, the relay UE, and the priority or failure UE may be generally referred to as wireless nodes, with the relay UE sometimes being referred to as a relay wireless node. In a downlink scenario, where the base station is attempting to transmit a data message to the priority or failure UE, the priority or failure UE may be referred to as a destination wireless node and the base station may be referred to as a source wireless node. In an uplink scenario, the base station may be referred to as the destination wireless node while the priority or failure UE may be referred to as the source wireless node.

Aspects of the disclosure are further illustrated by and described with reference to apparatus diagrams, system diagrams, and flowcharts that relate to signaling for fast relaying.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) (or LTE-Advanced) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine-type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may support signaling for fast relaying. Broadly, aspects of wireless communications system 100 may include UE(s) 115 and a base station 105 that uses one or more UEs 115 as relays to retransmit data and/or feedback messages between a priority UE (or destination wireless node) and a base station during a link failure. For example, a base station 105 may transmit, to a relay UE 115 (or relay wireless node) during a first TTI, a data message. The relay UE 115 may forward the data message to a priority UE that was unable to receive the data message directly from the base station 105. The base station 105 may transmit, to the relay UE 115, a first assignment of feedback resources to allow the relay UE 115 to receive a feedback message from the priority UE during a second TTI. The base station 105 may also transmit a second assignment of feedback resources to allow the relay UE 115 to retransmit the feedback message during the second TTI. Thus, when the priority UE receives the data message, as forwarded by the relay UE 115, the priority UE may broadcast a feedback message. The relay UE 115 may receive the feedback message during the second TTI and then retransmit the feedback message to the base station 105, also during the second TTI. The base station 105 may receive the feedback message from the relay UE 115.

Figure 2:
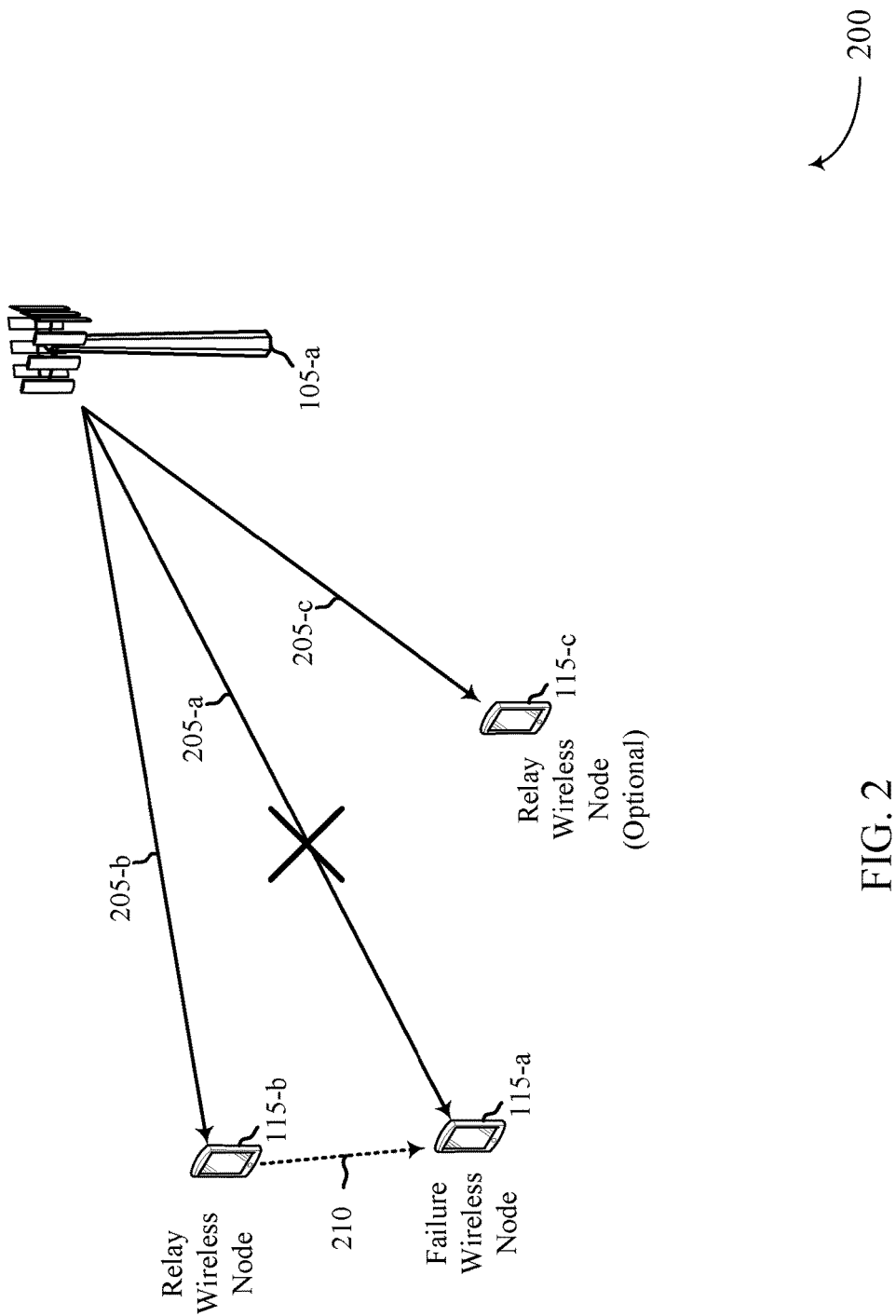
FIG. 2 illustrates an example of a wireless communication system that supports signaling for fast relaying in accordance with aspects of the present disclosure.

FIG. 2 illustrates an example of a wireless communication system 200 for signaling for fast relaying. Wireless communications system 200 may be an example of aspects of wireless communications system 100 of FIG. 1. Wireless communications system 200 may include a UE 115-*a*, a UE 115-*b*, a UE 115-*c*, and a base station 105-*a*, which may be examples of the corresponding devices of FIG. 1. UE 115-*a* may be a priority UE and/or the UE that experiences a link failure and may also be referred to as a wireless node, a destination wireless node, and the like. UE 115-*b* may be a relay UE and may also be referred to as a relay wireless node. UE 115-*c* may be an optional second relay UE and may also be referred to as an additional relay wireless node. Base station 105-*a* may also be referred to as a source wireless node. Broadly, wireless communications system 200 illustrates aspects of relay UE 115-*b* providing fast relaying for priority communications.

Base station 105-*a* may be a serving base station with respect to UEs 115-*a*, 115-*b*, and 115-*c* and may communicate via wireless links 205 (e.g., link 205-*a* to UE 115-*a*, link 205-*b* to UE 115-*b*, and link 205-*c* to UE 115-*c*). Base station 105-*a* may determine, store, and/or maintain a network geometry for UEs within its coverage area, e.g., UEs 115-*a*, 115-*b*, and 115-*c*. The network geometry may be determined or built using a periodic trained jamming graph, previous feedback messages, etc. The network geometry may provide an indication of which UEs are located within the coverage area of base station 105-*a*, where such UEs are located within the coverage area and/or with respect to each other, and the like.

UE 115-*a* may be associated with priority communications, e.g. MiCr communications. The priority communications may have or be associated with a predefined latency requirement and/or a predefined reliability requirement In one non-limiting example, the predefined latency requirement may be 500 micro-seconds and the predefined reliability requirement may be 10e-8.

Wireless communications system 200 may utilize a frame structure that includes, in some examples, a short TTI frame structure. In one non-limiting example, the frame structure may include four TTIs per frame with each TTI having a duration of 125 micro-seconds. In some aspects, each TTI may be referred to as a subframe, such as a MiCr short TTI subframe. In a downlink example, the frame structure may include four TTIs consisting of a downlink TTI, an uplink TTI, a downlink TTI, and an uplink TTI. This downlink frame structure may be referred to as a downlink-uplink-downlink-uplink (DUDU) frame structure. In an uplink example, the frame structure may include four TTIs consisting of an uplink TTI, a downlink TTI, an uplink TTI, and a downlink TTI. This downlink frame structure may be referred to as a uplink-downlink-uplink-downlink (UDUD) frame structure.

In some aspects, wireless communications system 200 may create path diversity by dynamically selecting relay nodes (e.g., UE 115-b and/or 1115-c) for vulnerable links/ failure UEs (e.g., UE 115-a). The relay node/UE may receive and forward feedback messages (e.g., ACK/NACK feedback messages) for the failure UE in one UL short-TTI subframe such that the latency requirements for MiCr communications are satisfied. For example and within a single DUDU frame, base station 105-a may schedule and transmit all data messages to the corresponding UEs in the first downlink TTI (or subframe). Based on feedback messages (e.g., ACK/NACK messages) received in the first uplink TTI (or subframe), base station 105-a may select UEs (e.g., UEs 115-b and/or 115-c, from which the base station 105-a received an ACK from) to help failure UEs (e.g., UE 115-a, from which the base station 105-a either received a NACK and/or did not receive an ACK/NACK). Base station 105-a may make this selection of the relay UEs according to the network geometry, periodically trained jamming graph, etc.

In the second downlink TTI (or subframe), base station 105-a may indicate to the selected UEs (e.g., UEs 115-b and/or 115-c) a resource assignment for data message relaying or retransmission. The indication may be provided via dedicated resource on a control channel (e.g., physical downlink control channel (PDCCH)). The selected UE(s) (e.g., UEs 115-b and/or 115-c) as well as the base station 105-a may transmit a header and data information (e.g., data message) to the failure UE (e.g., UE 115-a). The selected UE(s) (e.g., UEs 115-b and/or 115-c) may communicate with the failure UE (e.g., UE 115-a) via direct wireless link 210, which may be an example of an LTE-direct wireless link.

In the second uplink subframe, the UE 115-a may broadcast its feedback message (e.g., ACK/NACK message) to the selected UE(s) (e.g., UEs 115-b and/or 115-c) and to base station 105-a (even though base station 105-a may not receive this information as a result of the failure link). The feedback message may be broadcast during a first symbol period of the second TTI. After successfully decoding feedback message from the failure UE 115-a, the selected UE(s) (e.g., UE 115-b and/or 115-c) may forward this feedback message to base station 105-a before the end of the second uplink TTI. The feedback message may be forwarded during a second symbol period of the second uplink TTI. The first and second symbol periods may be separated by a predetermined number of symbol periods. This procedure may continue if more re-transmissions are permitted.

In some examples, base station 105-a may select a second relay UE (e.g., UE 115-c as an optional second relay UE). Thus, in the second downlink TTI, base station 105-a may select both UE 115-b and UE 115-c to act as relay UEs and forward the data messages to the UE 115-a. In the second uplink TTI, both of UEs 115-b and 115-c may receive and decode the feedback message broadcast from UE 115-a. Also in the second uplink TTI, both of UEs 115-b and 115-c may forward the feedback message to base station 105-a.

Although the example above generally refers to relaying of downlink data messages and the associated feedback reporting, this present disclosure is not limited to downlink operations. For example, failure UE 115-a may have priority uplink communications destined for base station 105-a, but which may be interrupted due to link failure. For example and in a first uplink TTI, UE 115-a may transmit the priority data message(s) to base station 105-a. Wireless link 205-a between UE 115-a and base station 105-a may be a failure link and therefore UE 115-a may not receive a feedback message from base station 105-a. UE 115-a may, however, monitor message(s) received from neighboring UEs (e.g., UEs 115-b and/or 115-c) and determine that at least one of the monitored UEs may act as a relay UE. UE 115-a may select relay UE 115-b and send in a second uplink a request to establish direct link 210 and for UE 115-b to relay data message(s) being transmitted to base station 105-a. UE 115-b may receive the header and data information for forwarding to base station 105-a via wireless link 205-b and during the second uplink TTI. Base station 105-a may respond by broadcasting a feedback message during a second downlink TTI (e.g., ACK/NACK message) that is received by UE 115-b. UE 115-b may retransmit the feedback message to UE 115-a during the second downlink TTI.

Thus, relay UE (such as one or both of UEs 115-b and/or 115-c) may receive, during the first TTI, a data message to be forwarded to a wireless node, which may be UE 115-a or base station 105-a. The relay UE may forward the data message to the wireless node during the first TTI. The relay UE may receive, during a second TTI, a feedback message from the wireless node and retransmit the feedback message during the second TTI. The feedback message may be responsive to the data message. The relay UE may receive an assignment of data resources during the first TTI, the data resources being used for forwarding the data message to the wireless node. The relay UE may receive, during the second TTI, a first assignment of feedback resources for receiving the feedback message from the wireless node and a second assignment of feedback resources for retransmitting the feedback message.

In some aspects, the first TTI may be a downlink TTI and the second TTI may be an uplink TTI. In some aspects, the first TTI may be an uplink TTI and the second TTI may be a downlink TTI. There may be a predetermined number of symbol periods between the symbol period that the feedback message is received and the symbol period that the feedback message is retransmitted. The assignment of resources may be received during a control portion of the TTI, e.g., via a PDCCH.

Moreover, a source wireless node such as base station 105-a (in a downlink scenario) may transmit, to a relay UE during the first TTI, the data message to be forwarded by the relay UE to the destination wireless node such as UE 115-a (in a downlink scenario) during the first TTI. The source wireless node may transmit, to the relay UE, the first assignment of feedback resources to allow the relay UE to receive a feedback message from the destination wireless node during a second TTI and the second assignment of feedback resources to allow the relay UE to retransmit the feedback message during the second TTI. The source wireless node may receive the feedback message from the relay UE during the second TTI.

The destination wireless node (e.g., UE 115-a in a downlink scenario) may receive the data message forwarded from the source wireless node via a relay UE (e.g., one or both of relay UEs 115-b and/or 115-c) during the first TTI. The destination wireless node may broadcast the feedback message during the second TTI in response to the data message. The broadcast feedback message may be broadcast such that source wireless node and/or at least one of the relay UEs may receive the feedback message.

Figure 3:
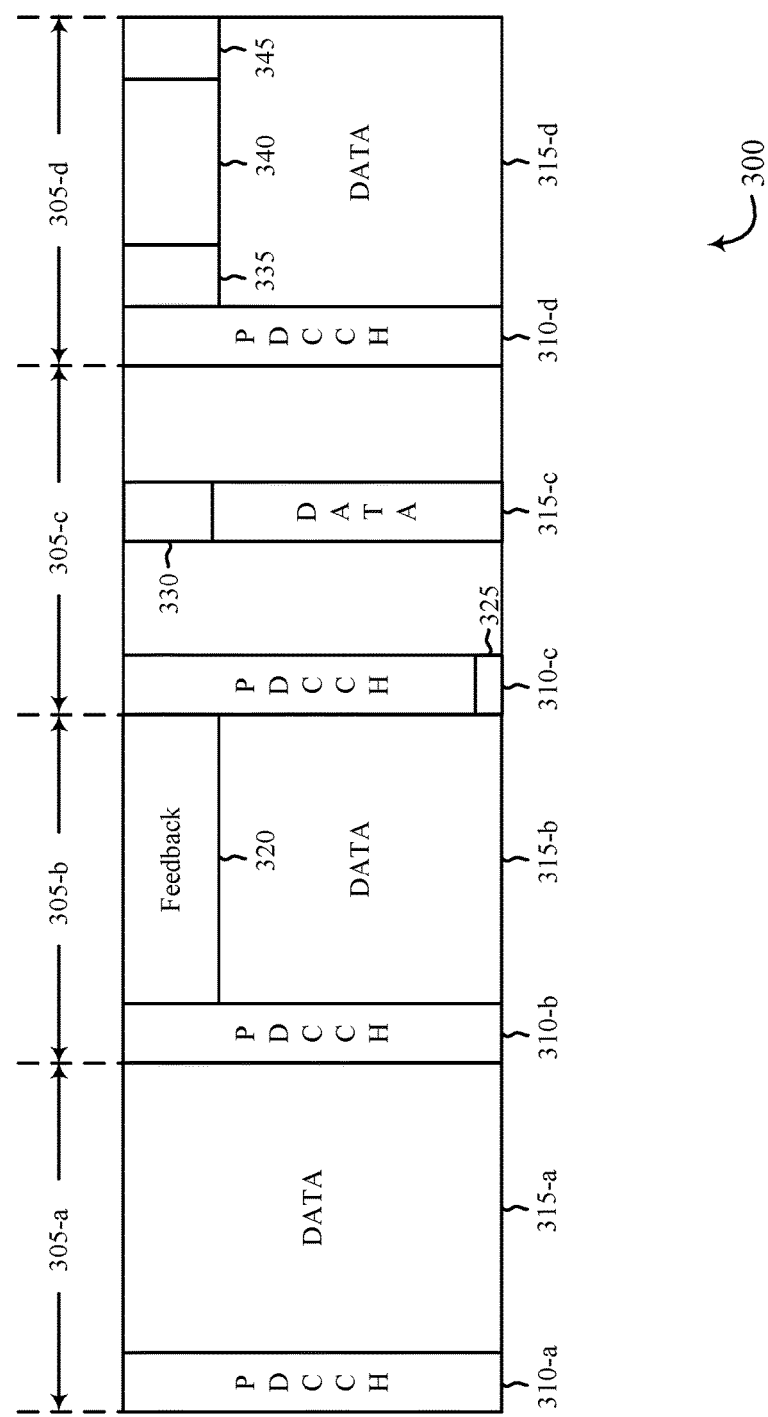
FIG. 3 illustrates an example of a frame structure that supports signaling for fast relaying in accordance with aspects of the present disclosure.

FIG. 3 illustrates an example of a frame structure 300 for signaling for fast relaying. Frame structure 300 may be implemented by aspects of wireless communications systems 100 and/or 200 of FIGS. 1 and 2. For example, a base station 105 and/or a UE 115 may support wireless communications using frame structure 300. The features of frame structure 300 will be described with reference to UEs 115-*a*, 115-*b*, 115-*c*, and base station 105-*a* of FIG. 2 for ease of reference.

Frame structure 300 may include a plurality of TTIs 305, with four TTIs being shown by way of example. Thus, frame structure 300 may include TTI 305-*a*, TTI-305-*b*, TTI 305-*c*, and TTI 305-*d*. In an example where frame structure 300 is a DUDU frame structure, TTI 305-*a* may be a downlink TTI, TTI 305-*b* may be an uplink TTI, TTI 305-*c* may be a downlink TTI, and TTI 305-*d* may be an uplink TTI. In an example where frame structure 300 is a UDUD frame structure, TTI 305-*a* may be an uplink TTI, TTI 305-*b* may be a downlink TTI, TTI 305-*c* may be an uplink TTI, and TTI 305-*d* may be a downlink TTI. The following discussion will generally refer to a DUDU frame structure. In some examples, a TTI 305 may also be referred to as a subframe. In other examples, TTIs 305 may have a duration different from a subframe.

Each TTI 305 may include a control portion 310 and a corresponding data portion 315. The control portion 310 may include control, scheduling, assignment information, and the like, and be conveyed via a PDCCH, as one example. The data portion 315 may generally include data information, feedback information, and the like. The data portion 315 may include a plurality of symbol periods.

In some aspects, in order to fulfill the latency requirements associated with priority communications, frame structure 300 may include a TTI structure (e.g., TTI 305-*d*) used for a relay UE. The TTI 305-*d* may include at least two feedback resources (e.g., ACK/NACK resources) that are a predetermined number of symbol periods apart to allow for feedback message receiving and forwarding by the relay UE. Signaling in the control portion 310 (e.g., PDCCH) may be used to shorten data transmission time and assign a sequential feedback resources such that the feedback message may be received and forwarded within one TTI, e.g., TTI 305-*d*.

During TTI 305-*a*, base station 105-*a* may transmit data message(s) to UE(s) located within its coverage area (e.g., UEs 115-*a*, 115-*b*, and/or 115-*c*), when applicable. At least a portion of the data message(s) may be associated with priority communications (e.g. MiCr communications for UE 115-*a*). During TTI 305-*b*, UEs 115-*b* and/or 115-*c* may send feedback messages during feedback portion 320, such as ACK/NACK messages, when applicable. Although priority data messages were directed to UE 115-*a*, base station 105-*a* may not receive feedback messages from UE 115-*a* during feedback portion 320 due to link failure, instantaneous blocking, etc. Based on the failure to receive feedback messages from UE 115-*a*, base station 105-*a* may select one or both of UEs 115-*b* and/or 115-*c* as relay UEs. The selection may be based on the network geometry, jamming graph, receipt of feedback messages during feedback portion 320, etc.

During TTI 305-*c*, base station 105-*a* may transmit an indication to relay UEs 115-*b* and/or 115-*c* of data resources associated with forwarding data messages to UE 115-*a*. The indication may use dedicated resources of the control portion 310-*c*, such as data resource indication 325. During the data portion 315-*c* of TTI 305-*c*, relay UEs 115-*b* and/or 115-*c* may transmit the data message to UE 115-*a* using data resources 330. The data message (e.g., header and data information) may be dynamically assigned by base station 105-*a*.

During TTI 305-*d*, base station 105-*a* may transmit an indication of an assignment of at least two feedback resources used for forwarding a feedback message from UE 115-*a*. A first feedback resource 335 may be used by the relay UEs 115-*b* and/or 115-*c* to receive and decode the feedback message broadcast from UE 115-*a*. The second feedback resource 345 may be used by the relay UEs 115-*b* and/or 115-*c* to forward the feedback message received from UE 115-*a* to base station 105-*a*. The first feedback resource 335 and the second feedback resource 345 may be separated by a predetermined number of symbol periods 340. For example, the first feedback resource 335 may be during a first symbol period of data portion 315-*d* and the second feedback resource 345 may be during a last symbol period of data portion 315-*d*. In another example, the predetermined number of symbol periods 340 may include symbol periods selected based on the processing time for relay UEs 115-*b* and/or 115-*c* to receive and decode the feedback message broadcast from UE 115-*a*.

Figure 4:
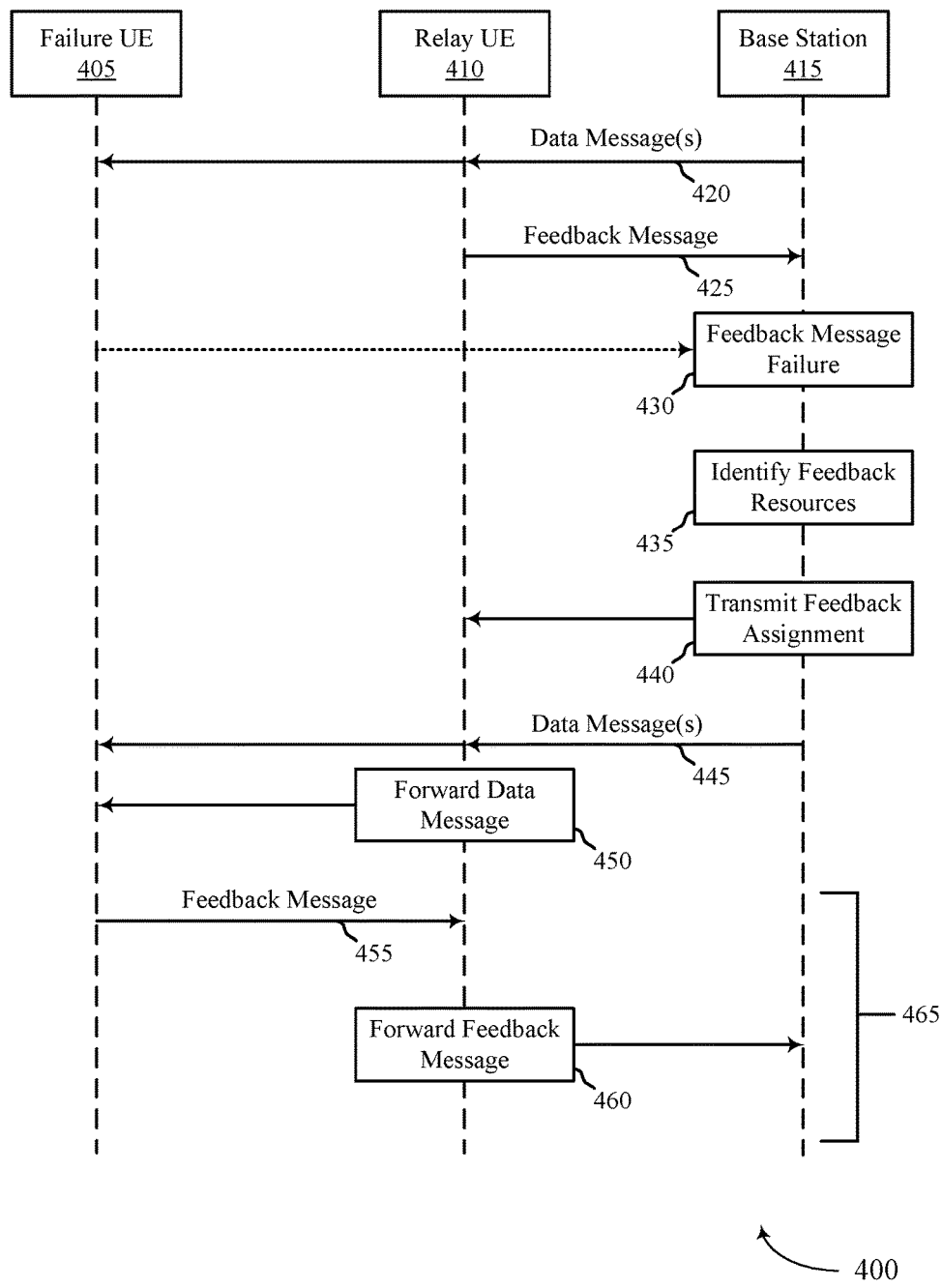
FIG. 4 illustrates an example of a process flow that supports signaling for fast relaying in accordance with aspects of the present disclosure.

FIG. 4 illustrates an example of a process flow 400 for signaling for fast relaying. Process flow 400 may implement aspects of wireless communications system 100 and/or 200 of FIGS. 1 and/or 2. Process flow 400 may implement aspects of frame structure 300 of FIG. 3. Process flow 400 may include a failure UE 405, a relay UE 410, and a base station 415, which may be examples of the corresponding devices of FIGS. 1 through 3. It is to be understood that the process flow 400 is not limited to only one relay UE 410. Base station 415 may be a serving base station for failure UE 405 and for relay UE 410.

At 420, base station 415 may transmit data message(s) to UEs 405 and 410. The data message transmitted to UE 405 may be a priority communication, such as a MiCr data message. The data messages transmitted at 420 may be transmitted during a TTI, such as TTI 305-*a* of frame structure 300.

At 425, relay UE 410 may transmit a feedback message to base station 415. The feedback message may be an ACK/NACK message, in some examples. The feedback message may be responsive to a data message transmitted to relay UE 410. The feedback message may be transmitted during a TTI, such as TTI 305-*b* of frame structure 300.

At 430, base station 415 may identify or determine that a feedback message failure has occurred with respect to failure UE 405. The feedback message may be expected from failure 405 based on a priority data message being transmitted to failure UE 405 at 420. The feedback message failure may be based on receiving a NACK feedback message from failure UE 405 and/or be based on receiving no feedback message from failure UE 405. The feedback message failure may be indicative of a link failure between failure UE 405 and base station 415.

At 435, base station 415 may identify feedback resources based, at least in some aspects, on the feedback message failure. The feedback resources may include resource assignments for retransmission of a feedback message from failure UE 405 by relay UE 410. The feedback resources may include a first assignment of feedback resources during a first symbol period of a TTI, such as TTI 305-*d* of frame structure 300, that are used by relay UE 410 to receive and decode the feedback message from failure UE 405. The feedback resources may include a second assignment of feedback resources during a second symbol period of the TTI that are used by relay UE 410 to retransmit the feedback message from failure UE 405 to base station 415. The feedback resources may further include an indication that the relay UE 410 is to retransmit the data message to the failure UE 405.

At 440, base station 415 may transmit an indication of the feedback resources to relay UE 410. At 445, the base station 415 may transmit data messages to relay UE 410 and to failure UE 405. The data message may be a retransmission of the priority data messages transmitted at 420. At 450, the relay UE 410 may forward the data messages to failure UE 405 via a direct wireless link. Forwarding of the data message by relay UE 410 may be in response to the indication included in the feedback resources.

At 445, failure UE 405 may transmit and relay UE 410 may receive a feedback message. The feedback message may be broadcast on the first feedback resource assignment, e.g., during the first symbol period. At 460, the relay UE 410 may forward the feedback message from failure UE 405 to the base station 415. The forwarded feedback message may be transmitted on the second feedback resource assignment during the TTI. The feedback message transmitted at 455 and the forwarded feedback message forwarded at 460 may be transmitted in the same TTI, as indicated by bracket 465.

Figure 5:
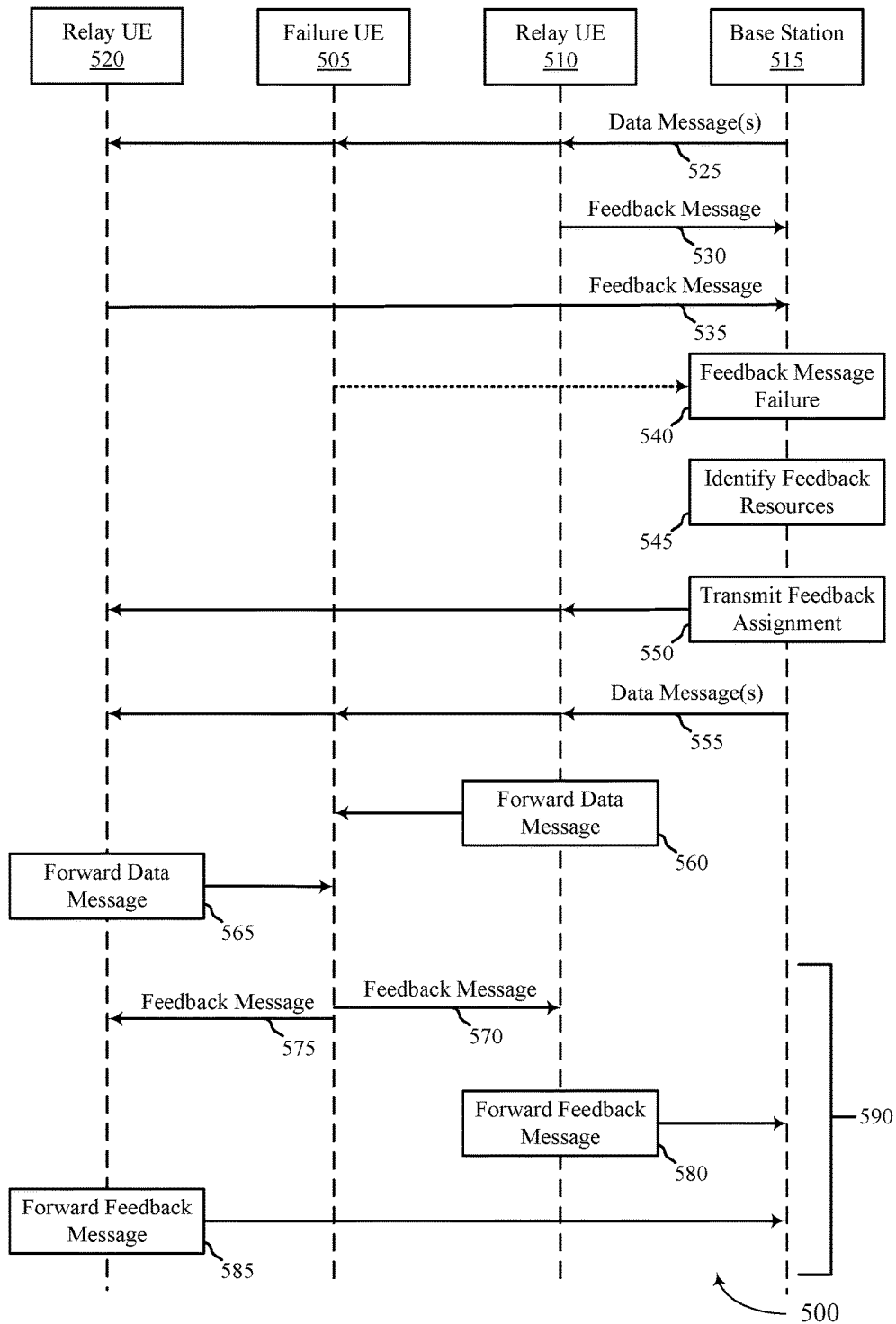
FIG. 5 illustrates an example of a process flow that supports signaling for fast relaying in accordance with aspects of the present disclosure.

FIG. 5 illustrates an example of a process flow 500 for signaling for fast relaying. Process flow 500 may implement aspects of wireless communications system 100 and/or 200 of FIGS. 1 and/or 2. Process flow 500 may implement aspects of frame structure 300 of FIG. 3. Process flow 500 may include a failure UE 505, a relay UE 510, a base station 515, and an optional additional relay UE 520, which may be examples of the corresponding devices of FIGS. 1 through 3. Base station 515 may be a serving base station for failure UE 505, relay UE 510, and for additional relay UE 520.

At 525, base station 515 may transmit data message(s) to UEs 505, 510, and 520. The data message transmitted to UE 505 may be a priority communication, such as a MiCr data message. The data messages transmitted at 525 may be transmitted during a TTI, such as TTI 305-*a* of frame structure 300.

At 530, relay UE 510 may transmit a feedback message to base station 515. The feedback message may be an ACK/NACK message, in some examples. The feedback message may be responsive to a data message transmitted to relay UE 510. The feedback message may be transmitted during a TTI, such as TTI 305-*b* of frame structure 300.

At 535, additional relay UE 520 may transmit a feedback message to base station 515. The feedback message may be an ACK/NACK message, in some examples. The feedback message may be responsive to a data message transmitted to additional relay UE 520. The feedback message may be transmitted during a TTI, such as TTI 305-*b* of frame structure 300.

At 540, base station 515 may identify or determine that a feedback message failure has occurred with respect to failure UE 505. The feedback message may be expected from failure 505 based on a priority data message being transmitted to failure UE 505 at 525. The feedback message failure may be based on receiving a NACK feedback message from failure UE 505 and/or be based on receiving no feedback message from failure UE 505. The feedback message failure may be indicative of a link failure between failure UE 505 and base station 515.

At 545, base station 515 may identify feedback resources based, at least in some aspects, on the feedback message failure. The feedback resources may include resource assignments for retransmission of a feedback message from failure UE 505 by relay UE 510 and by additional relay UE 520. The feedback resources may include a first assignment of feedback resources during a first symbol period of a TTI, such as TTI 305-*d* of frame structure 300, that are used by relay UE 510 and additional relay UE 520 to receive and decode the feedback message from failure UE 505. The feedback resources may include a second assignment of feedback resources during a second symbol period of the TTI that are used by relay UE 510 and additional relay UE 520 to retransmit the feedback message from failure UE 505 to base station 515. The feedback resources may further include an indication that the relay UEs 510, 520 are to retransmit the data message to the failure UE 505.

At 550, base station 515 may transmit an indication of the feedback resources to relay UE 510 and to additional relay UE 520. At 555, the base station 515 may transmit data messages to relay UE 510, to additional relay UE 520, and to failure UE 505. The data message may be a retransmission of the priority data messages transmitted at 525. At 560, the relay UE 510 may forward the data messages to failure UE 505 via a direct wireless link, in response to the indication included in the feedback resources. At 565, the additional relay UE 520 may forward the data messages to failure UE 550 via a direct wireless link, also in response to the indication included in the feedback resources. This may provide redundancy for the data message transmission.

At 570, failure UE 505 may transmit and relay UE 510 may receive a feedback message. At 575, failure UE 505 may transmit and additional relay UE 520 may receive a feedback message. The feedback messages may be broadcast on the first feedback resource assignment, e.g., during the first symbol period. At 580, the relay UE 510 may forward the feedback message from failure UE 505 to the base station 515. At 585, the additional relay UE 520 may forward the feedback message from failure UE 505 to the base station 515. The forwarded feedback messages may be transmitted on the second feedback resource assignment during the TTI. The feedback messages transmitted at 570 and 575 and the forwarded feedback messages forwarded at 580 and 585 may be transmitted in the same TTI, as indicated by bracket 590.

Figure 6:
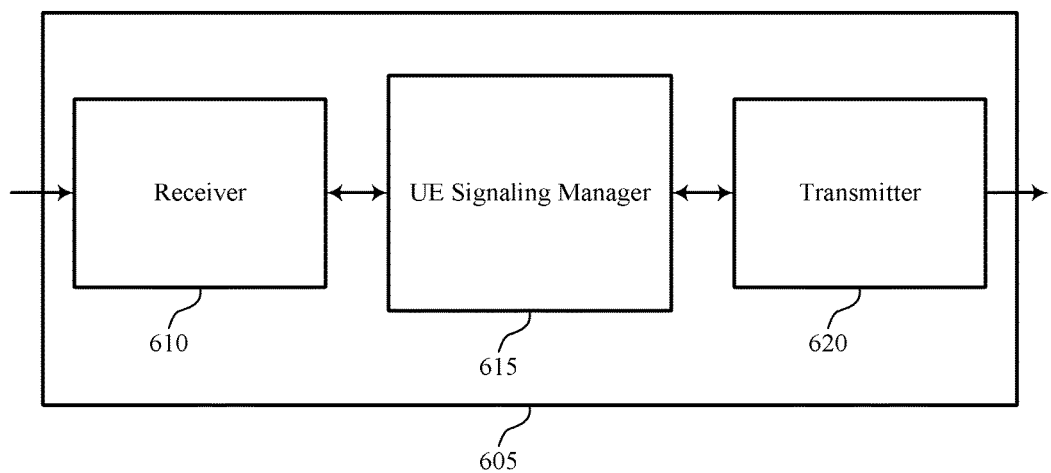
FIGS. 6 through 8 show block diagrams of a device that supports signaling for fast relaying in accordance with aspects of the present disclosure.

FIG. 6 shows a block diagram 600 of a wireless device 605 that supports signaling for fast relaying in accordance with various aspects of the present disclosure. Wireless device 605 may be an example of aspects of a UE 115 as described with reference to FIGS. 1 through 5. Wireless device 605 may include receiver 610, UE signaling manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to signaling for fast relaying, etc.). Information may be passed on to other components of the device. The receiver 610 may be an example of aspects of the transceiver 935 described with reference to FIG. 9.

UE signaling manager 615 may be an example of aspects of the UE signaling manager 915 described with reference to FIG. 9.

When device 605 is configured as a relay UE, UE signaling manager 615 may receive, during a first TTI, a data message to be forwarded to a wireless node, forward the data message to the wireless node during the first TTI, receive, during a second TTI, a feedback message from the wireless node, and retransmit the feedback message during the second TTI. When device 605 is configured as a failure UE, UE signaling manager 615 may receive a data message forwarded from a source wireless node via a relay wireless node during a first TTI and broadcast a feedback message during a second TTI in response to the data message such that one or both of the source wireless node and the relay wireless node receives the feedback message.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
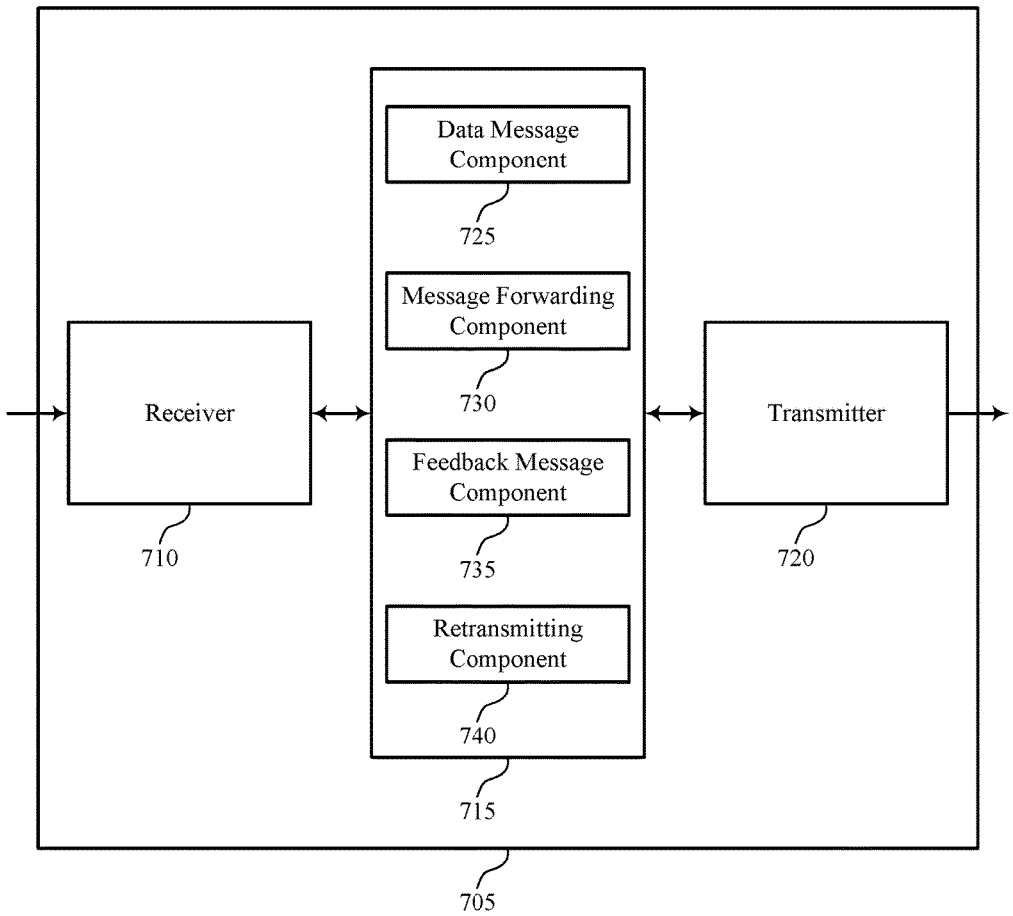

FIG. 7 shows a block diagram 700 of a wireless device 705 that supports signaling for fast relaying in accordance with various aspects of the present disclosure. Wireless device 705 may be an example of aspects of a wireless device 605 or a UE 115 as described with reference to FIGS. 1 through 6. Wireless device 705 may include receiver 710, UE signaling manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to signaling for fast relaying, etc.). Information may be passed on to other components of the device. The receiver 710 may be an example of aspects of the transceiver 935 described with reference to FIG. 9.

UE signaling manager 715 may be an example of aspects of the UE signaling manager 915 described with reference to FIG. 9. UE signaling manager 715 may also include data message component 725, message forwarding component 730, feedback message component 735, and retransmitting component 740.

Data message component 725 may receive, during a first TTI, a data message to be forwarded to a wireless node. Message forwarding component 730 may forward the data message to the wireless node during the first TTI. In some aspects, for example when device 705 is configured as a failure UE, data message component 725 may receive a data message forwarded from a source wireless node via a relay wireless node during a first TTI. In some cases, the wireless node is associated with a priority communication.

Feedback message component 735 may receive, during a second TTI, a feedback message from the wireless node. In some cases, the feedback message is responsive to the data message. In some cases, the second TTI includes a predefined number of symbol periods in between receiving the feedback message and retransmitting the feedback message. In some cases, the feedback message includes an ACK/NACK message. In some aspects, the feedback message component may broadcast a feedback message during a second TTI in response to the data message such that one or both of the source wireless node and the relay wireless node receives the feedback message, and receive an indication that the feedback message is to be broadcasted Retransmitting component 740 may retransmit the feedback message during the second TTI. In some cases, the first TTI is a downlink TTI and the second TTI is an uplink TTI. In some cases, the first TTI is an uplink TTI and the second TTI is a downlink TTI.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
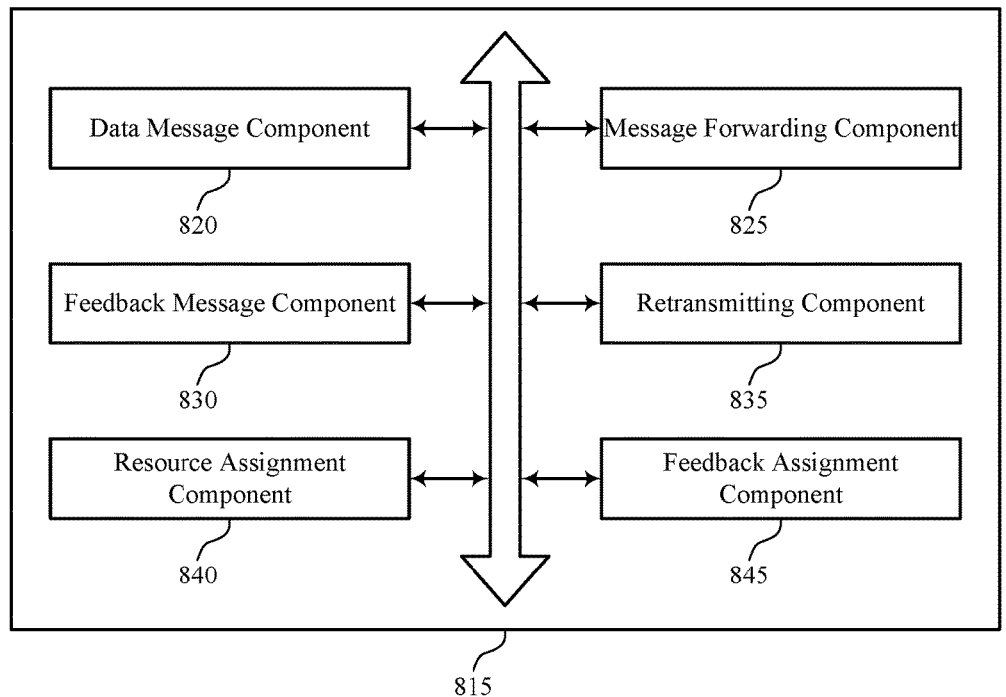

FIG. 8 shows a block diagram 800 of a UE signaling manager 815 that supports signaling for fast relaying in accordance with various aspects of the present disclosure. The UE signaling manager 815 may be an example of aspects of a UE signaling manager 615, a UE signaling manager 715, or a UE signaling manager 915 described with reference to FIGS. 6, 7, and 9. The UE signaling manager 815 may include data message component 820, message forwarding component 825, feedback message component 830, retransmitting component 835, resource assignment component 840, and feedback assignment component 845. Each of these modules may communicate, directly or indirectly, with one another (e.g., via one or more buses).

Data message component 820 may receive, during a first TTI, a data message to be forwarded to a wireless node. In some cases, the data message component 820 may receive a data message forwarded from a source wireless node via a relay wireless node during a first TTI. In some cases, the wireless node is associated with a priority communication. Message forwarding component 825 may forward the data message to the wireless node during the first TTI.

Feedback message component 830 may receive, during a second TTI, a feedback message from the wireless node. In some cases, the feedback message is responsive to the data message. In some cases, the second TTI includes a predefined number of symbol periods in between receiving the feedback message and retransmitting the feedback message. In some cases, the feedback message includes an ACK/NACK message. In some cases, the feedback message component 830 may broadcast a feedback message during a second TTI in response to the data message such that one or both of the source wireless node and the relay wireless node receives the feedback message, and receive an indication that the feedback message is to be broadcasted.

Retransmitting component 835 may retransmit the feedback message during the second TTI. In some cases, the first TTI is a downlink TTI and the second TTI is an uplink TTI. In some cases, the first TTI is an uplink TTI and the second TTI is a downlink TTI.

Resource assignment component 840 may receive, during the first TTI, an assignment of data resources for forwarding the data message to the wireless node.

Feedback assignment component 845 may receive, on a PDCCH, an assignment of feedback resources for receiving the feedback message from the wireless node and for retransmitting the feedback message. In some cases, the feedback assignment component 845 may receive the assignment of feedback resources during a control portion of the second TTI. In some cases, the feedback assignment component 845 may receive the assignment of feedback resources during a control portion of a TTI other than the second TTI. In some cases, feedback assignment component 845 may receive, during the second TTI, a first assignment of feedback resources for receiving the feedback message from the wireless node and a second assignment of feedback resources for retransmitting the feedback message.

Figure 9:
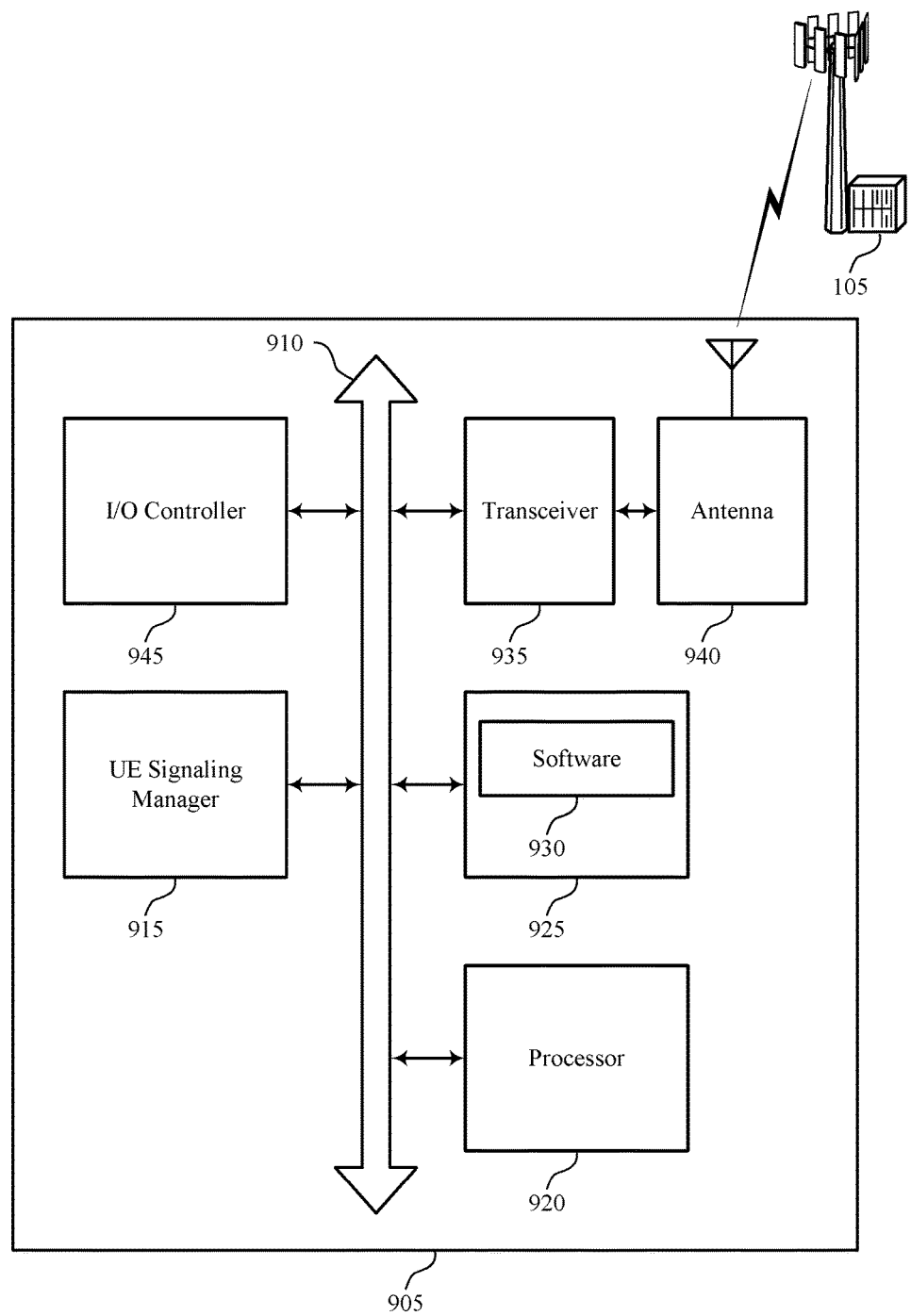
FIG. 9 illustrates a block diagram of a system including a UE that supports signaling for fast relaying in accordance with aspects of the present disclosure.

FIG. 9 shows a diagram of a system 900 including a device 905 that supports signaling for fast relaying in accordance with various aspects of the present disclosure. Device 905 may be an example of or include the components of wireless device 605, wireless device 705, or a UE 115 as described above, e.g., with reference to FIGS. 1 through 7. Device 905 may include components for bi-directional voice and data communications including components for transmitting and receiving communications, including UE signaling manager 915, processor 920, memory 925, software 930, transceiver 935, antenna 940, and I/O controller 945.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting signaling for fast relaying). 920.

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support signaling for fast relaying. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
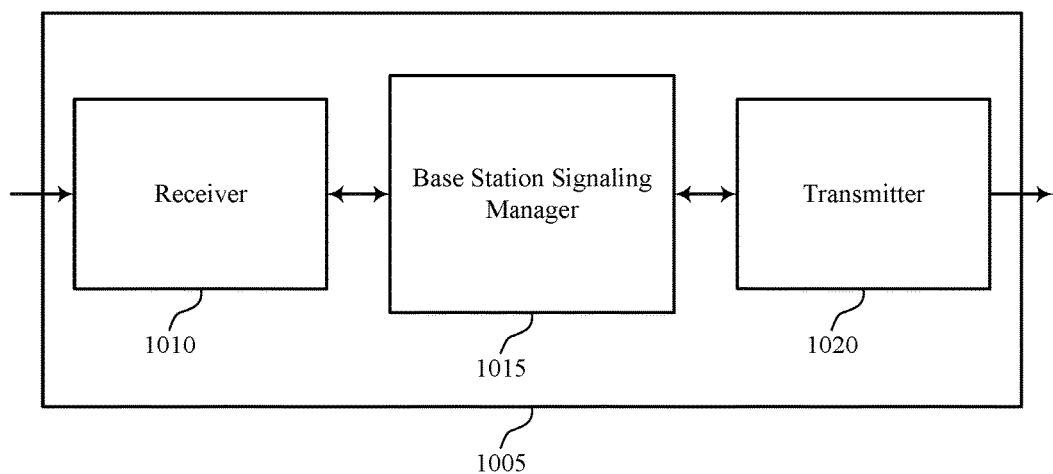
FIGS. 10 through 12 show block diagrams of a device that supports signaling for fast relaying in accordance with aspects of the present disclosure.

FIG. 10 shows a block diagram 1000 of a wireless device 1005 that supports signaling for fast relaying in accordance with various aspects of the present disclosure. Wireless device 1005 may be an example of aspects of a base station 105 as described with reference to FIGS. 1 through 5. Wireless device 1005 may include receiver 1010, base station signaling manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to signaling for fast relaying, etc.). Information may be passed on to other components of the device. The receiver 1010 may be an example of aspects of the transceiver 1335 described with reference to FIG. 13. Base station signaling manager 1015 may be an example of aspects of the base station signaling manager 1315 described with reference to FIG. 13.

Base station signaling manager 1015 may transmit, to a relay wireless node during a first TTI, a data message to be forwarded by the relay wireless node to a destination wireless node during the first TTI, transmit, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI, and receive the feedback message from the relay wireless node during the second TTI.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
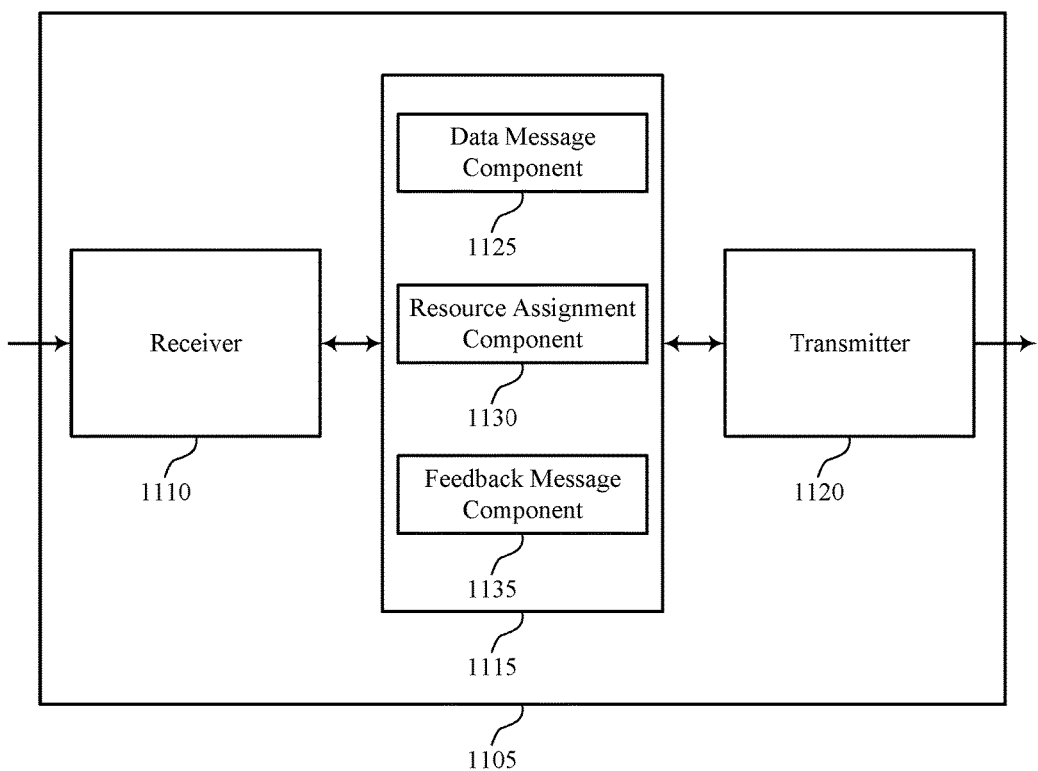

FIG. 11 shows a block diagram 1100 of a wireless device 1105 that supports signaling for fast relaying in accordance with various aspects of the present disclosure. Wireless device 1105 may be an example of aspects of a wireless device 1005 or a base station 105 as described with reference to FIGS. 1 through 5 and 10. Wireless device 1105 may include receiver 1110, base station signaling manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to signaling for fast relaying, etc.). Information may be passed on to other components of the device. The receiver 1110 may be an example of aspects of the transceiver 1335 described with reference to FIG. 13.

Base station signaling manager 1115 may be an example of aspects of the base station signaling manager 1315 described with reference to FIG. 13. Base station signaling manager 1115 may also include data message component 1125, resource assignment component 1130, and feedback message component 1135.

Data message component 1125 may transmit, to a relay wireless node during a first TTI, a data message to be forwarded by the relay wireless node to a destination wireless node during the first TTI. In some cases, the wireless node is associated with a priority communication.

Resource assignment component 1130 may transmit, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI. In some cases, the first TTI is a downlink TTI and the second TTI is an uplink TTI. In some cases, the first TTI is an uplink TTI and the second TTI is a downlink TTI.

Feedback message component 1135 may receive the feedback message from the relay wireless node during the second TTI and receive the feedback message from the additional relay wireless node during the second TTI. In some cases, the feedback message is responsive to the data message. In some cases, the feedback message includes an ACK/NACK message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
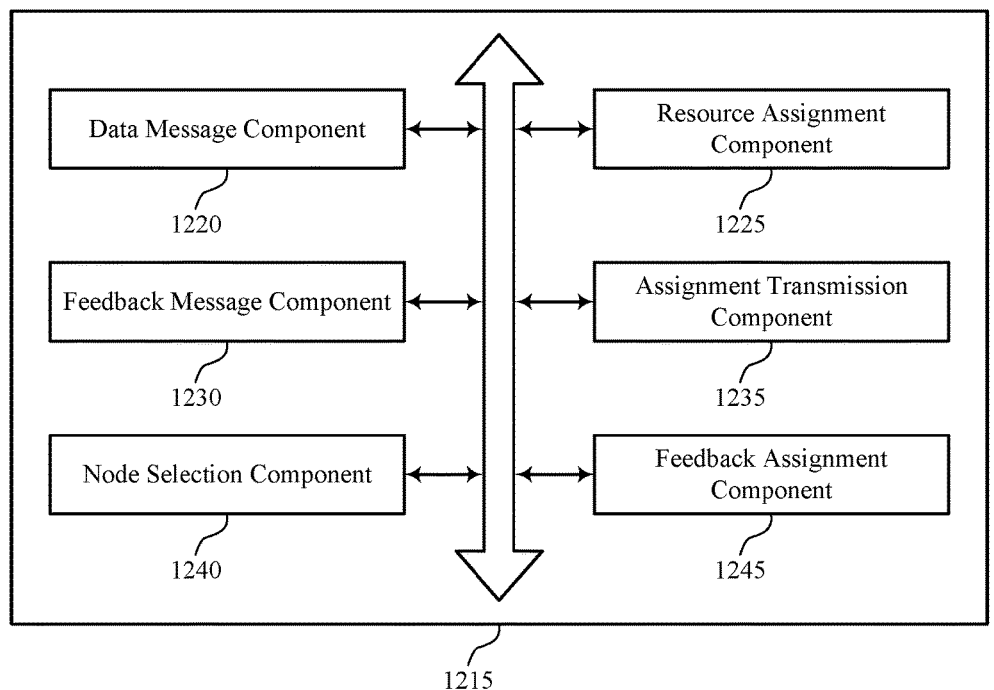

FIG. 12 shows a block diagram 1200 of a base station signaling manager 1215 that supports signaling for fast relaying in accordance with various aspects of the present disclosure. The base station signaling manager 1215 may be an example of aspects of a base station signaling manager 1315 described with reference to FIGS. 10, 11, and 13. The base station signaling manager 1215 may include data message component 1220, resource assignment component 1225, feedback message component 1230, assignment transmission component 1235, node selection component 1240, and feedback assignment component 1245. Each of these modules may communicate, directly or indirectly, with one another (e.g., via one or more buses).

Data message component 1220 may transmit, to a relay wireless node during a first TTI, a data message to be forwarded by the relay wireless node to a destination wireless node during the first TTI. In some cases, the wireless node is associated with a priority communication.

Resource assignment component 1225 may transmit, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI. In some cases, the first TTI is a downlink TTI and the second TTI is an uplink TTI. In some cases, the first TTI is an uplink TTI and the second TTI is a downlink TTI.

Feedback message component 1230 may receive the feedback message from the relay wireless node during the second TTI and receive the feedback message from the additional relay wireless node during the second TTI. In some cases, the feedback message is responsive to the data message. In some cases, the feedback message includes an ACK/NACK message.

Assignment transmission component 1235 may transmit, to an additional relay wireless node, the first assignment of feedback resources to allow the additional relay wireless node to receive the feedback message from the destination wireless node during the second TTI and the second assignment of feedback resources to allow the additional relay wireless node to retransmit the feedback message during the second TTI and transmit, during the first TTI, an assignment of data resources for forwarding the data message to the destination wireless node.

Node selection component 1240 may select the relay wireless node for transmission of the data message to be forwarded to the destination wireless node during the first TTI based on successful receipt of a previous feedback message received from the relay wireless node. In some cases, node selection component 1240 may select the relay wireless node for transmission of the data message to be forwarded to the destination wireless node during the first TTI based on a geometry of a wireless network.

Feedback assignment component 1245 may transmit the first assignment of feedback resources and the second assignment of feedback resources during a control portion of the second TTI. In some cases, the feedback assignment component 1245 may transmit the first assignment of feedback resources and the second assignment of feedback resources during a control portion of a TTI other than the second TTI. In some cases, transmitting the first assignment of feedback resources and the second assignment of feedback resources includes: transmitting the first assignment of feedback resources and the second assignment of feedback resources on a PDCCH.

Figure 13:
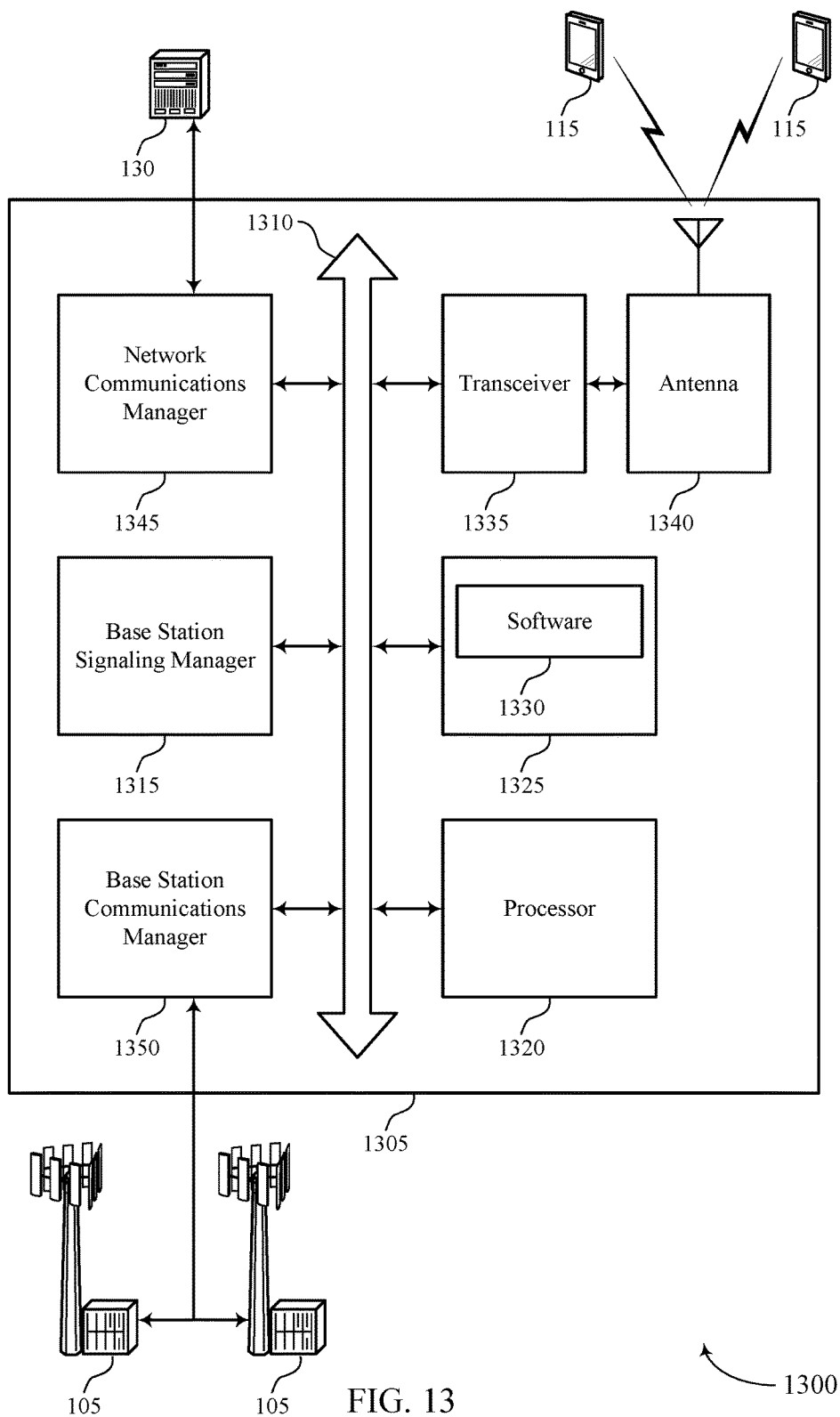
FIG. 13 illustrates a block diagram of a system including a base station that supports signaling for fast relaying in accordance with aspects of the present disclosure.

FIG. 13 shows a diagram of a system 1300 including a device 1305 that supports signaling for fast relaying in accordance with various aspects of the present disclosure. Device 1305 may be an example of or include the components of base station 105 as described above, e.g., with reference to FIGS. 1 through 5. Device 1305 may include components for bi-directional voice and data communications including components for transmitting and receiving communications, including base station signaling manager 1315, processor 1320, memory 1325, software 1330, transceiver 1335, antenna 1340, network communications manager 1345, and base station communications manager 1350.

Processor 1320 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting signaling for fast relaying). 1320.

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support signaling for fast relaying. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base station 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
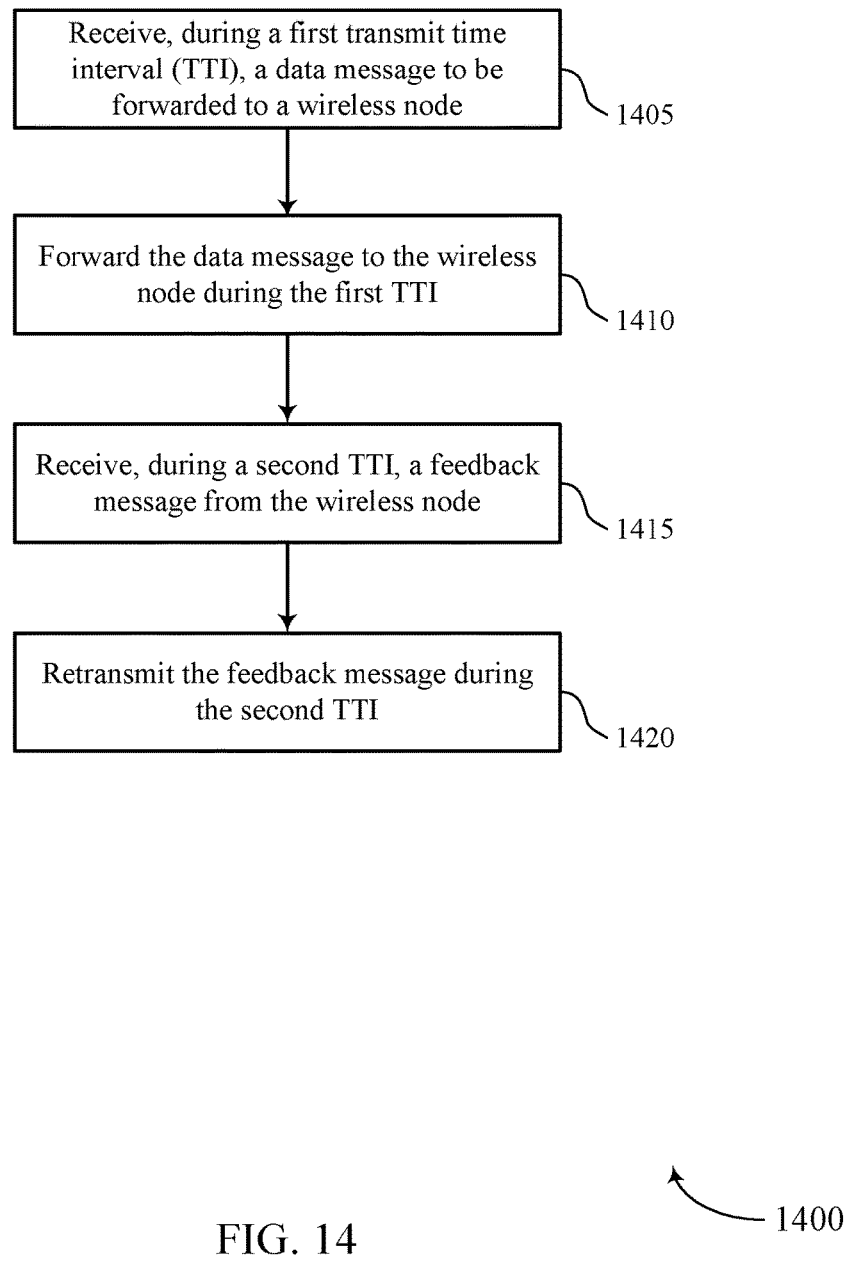
FIGS. 14 through 16 illustrate methods for signaling for fast relaying in accordance with aspects of the present disclosure.

FIG. 14 shows a flowchart illustrating a method 1400 for signaling for fast relaying in accordance with various aspects of the present disclosure. The operations of method 1400 may be implemented by a UE 115 or its components as described herein. The UE 115 may be a relay UE, as is described with reference to FIGS. 2 through 5. For example, the operations of method 1400 may be performed by a UE signaling manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, during a first TTI, a data message to be forwarded to a wireless node. The operations of block 1405 may be performed according to the features described with reference to FIGS. 1 through 5. In certain examples, aspects of the operations of block 1405 may be performed by a data message component as described with reference to FIGS. 6 through 9.

At block 1410 the UE 115 may forward the data message to the wireless node during the first TTI. The operations of block 1410 may be performed according to the methods described with reference to FIGS. 1 through 5. In certain examples, aspects of the operations of block 1410 may be performed by a message forwarding component as described with reference to FIGS. 6 through 9.

At block 1415 the UE 115 may receive, during a second TTI, a feedback message from the wireless node. The operations of block 1415 may be performed according to the methods described with reference to FIGS. 1 through 5. In certain examples, aspects of the operations of block 1415 may be performed by a feedback message component as described with reference to FIGS. 6 through 9.

At block 1420 the UE 115 may retransmit the feedback message during the second TTI. The operations of block 1420 may be performed according to the methods described with reference to FIGS. 1 through 5. In certain examples, aspects of the operations of block 1420 may be performed by a retransmitting component as described with reference to FIGS. 6 through 9.

Figure 15:
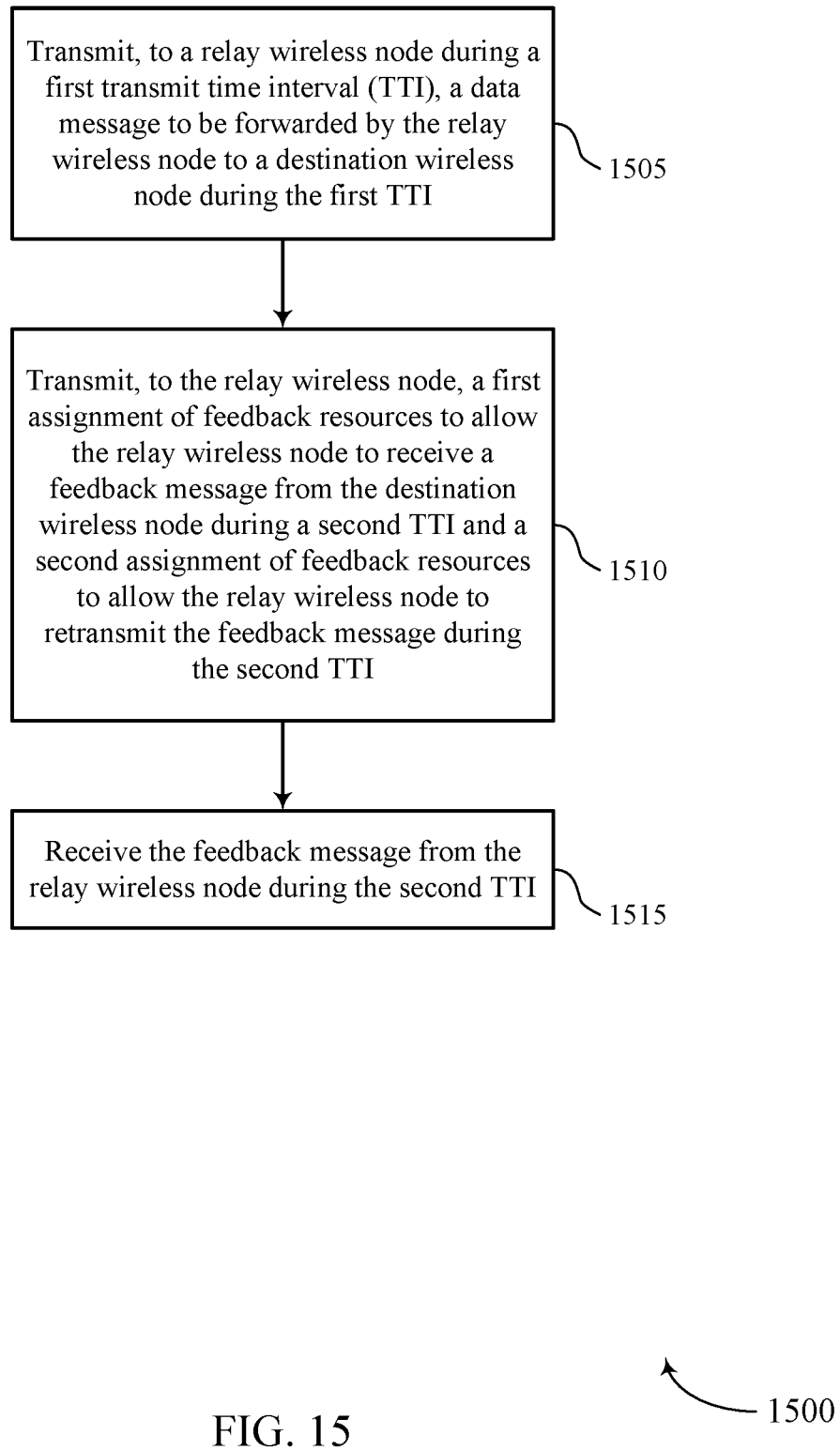

FIG. 15 shows a flowchart illustrating a method 1500 for signaling for fast relaying in accordance with various aspects of the present disclosure. The operations of method 1500 may be implemented by a base station 105 or its components as described herein. In some cases, the operations of method 1500 may be a source node, such as a base station 105 in a downlink scenario or as a UE 115 in an uplink scenario, as is described with reference to FIGS. 2 through 5. For example, the operations of method 1500 may be performed by a base station signaling manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may transmit, to a relay wireless node during a first TTI, a data message to be forwarded by the relay wireless node to a destination wireless node during the first TTI. The operations of block 1505 may be performed according to the methods described with reference to FIGS. 1 through 5. In certain examples, aspects of the operations of block 1505 may be performed by a data message component as described with reference to FIGS. 10 through 13.

At block 1510 the base station 105 may transmit, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI. The operations of block 1510 may be performed according to the methods described with reference to FIGS. 1 through 5. In certain examples, aspects of the operations of block 1510 may be performed by a resource assignment component as described with reference to FIGS. 10 through 13.

At block 1515 the base station 105 may receive the feedback message from the relay wireless node during the second TTI. The operations of block 1515 may be performed according to the methods described with reference to FIGS. 1 through 5. In certain examples, aspects of the operations of block 1515 may be performed by a feedback message component as described with reference to FIGS. 10 through 13.

Figure 16:
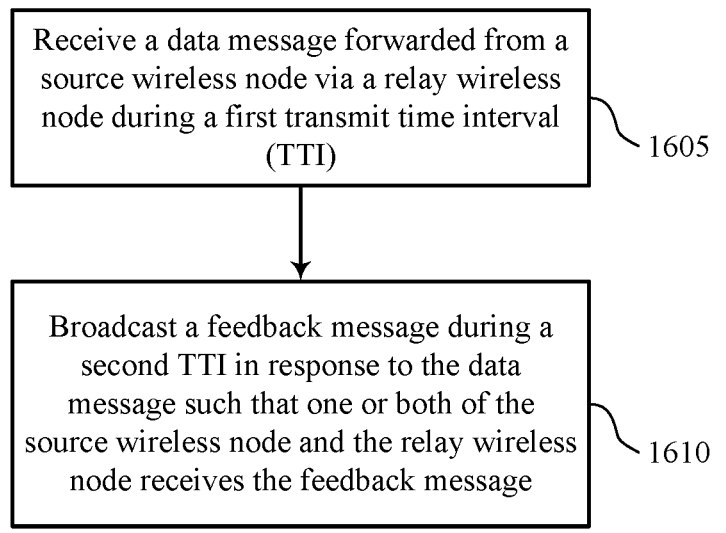

FIG. 16 shows a flowchart illustrating a method 1600 for signaling for fast relaying in accordance with various aspects of the present disclosure. The operations of method 1600 may be implemented by a UE 115 or its components as described herein. In some examples, the operations of the method 1600 may be implemented by a destination wireless node, as is described with reference to FIGS. 2 through 5. For example, the operations of method 1600 may be performed by a UE signaling manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a data message forwarded from a source wireless node via a relay wireless node during a first TTI. The operations of block 1605 may be performed according to the methods described with reference to FIGS. 1 through 5. In certain examples, aspects of the operations of block 1605 may be performed by a data message component as described with reference to FIGS. 6 through 9.

At block 1610 the UE 115 may broadcast a feedback message during a second TTI in response to the data message such that one or both of the source wireless node and the relay wireless node receives the feedback message. The operations of block 1610 may be performed according to the methods described with reference to FIGS. 1 through 5. In certain examples, aspects of the operations of block 1610 may be performed by a feedback message component as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are new releases of UMTS that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a relay wireless node, comprising:
    receiving, during a first transmit time interval (TTI), a data message to be forwarded to a wireless node;
    forwarding the data message to the wireless node during the first TTI;
    receiving, during a second TTI, a feedback message from the wireless node; and
    retransmitting the feedback message during the second TTI.

2. The method of claim 1, further comprising:
    receiving, during the first TTI, an assignment of data resources for forwarding the data message to the wireless node.

3. The method of claim 1, further comprising:
    receiving, during the second TTI, a first assignment of feedback resources for receiving the feedback message from the wireless node and a second assignment of feedback resources for retransmitting the feedback message.

4. The method of claim 1, wherein the first TTI is a downlink TTI and the second TTI is an uplink TTI.

5. The method of claim 1, wherein the first TTI is an uplink TTI and the second TTI is a downlink TTI.

6. The method of claim 1, wherein the feedback message is responsive to the data message.

7. The method of claim 1, wherein the second TTI includes a predefined number of symbol periods in between receiving the feedback message and retransmitting the feedback message.

8. The method of claim 1, further comprising:
    receiving, on a physical downlink control channel (PDCCH), an assignment of feedback resources for receiving the feedback message from the wireless node and for retransmitting the feedback message.

9. The method of claim 8, further comprising:
    receiving the assignment of feedback resources occurs during a control portion of the second TTI.

10. The method of claim 8, further comprising:
    receiving the assignment of feedback resources occurs during a control portion of a TTI other than the second TTI.

11. The method of claim 1, wherein the wireless node is associated with a priority communication.

12. The method of claim 1, wherein the feedback message comprises an acknowledgement/negative acknowledgement (ACK/NACK) message.

13. A method for wireless communication, comprising:
    transmitting, to a relay wireless node during a first transmit time interval (TTI), a data message to be forwarded by the relay wireless node to a destination wireless node during the first TTI;
    transmitting, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI; and receiving the feedback message from the relay wireless node during the second TTI.

14. The method of claim 13, further comprising:

transmitting, to an additional relay wireless node, the first assignment of feedback resources to allow the additional relay wireless node to receive the feedback message from the destination wireless node during the second TTI and the second assignment of feedback resources to allow the additional relay wireless node to retransmit the feedback message during the second TTI; and receiving the feedback message from the additional relay wireless node during the second TTI.

15. The method of claim 13, further comprising:

selecting the relay wireless node for transmission of the data message to be forwarded to the destination wireless node during the first TTI based at least in part on successful receipt of a previous feedback message received from the relay wireless node.

16. The method of claim 13, further comprising:

selecting the relay wireless node for transmission of the data message to be forwarded to the destination wireless node during the first TTI based at least in part on a geometry of a wireless network.

17. The method of claim 13, further comprising:

transmitting, during the first TTI, an assignment of data resources for forwarding the data message to the destination wireless node.

18. The method of claim 13, wherein the first TTI is a downlink TTI and the second TTI is an uplink TTI.

19. The method of claim 13, wherein the first TTI is an uplink TTI and the second TTI is a downlink TTI.

20. The method of claim 13, wherein the feedback message is responsive to the data message.

21. The method of claim 13, wherein transmitting the first assignment of feedback resources and the second assignment of feedback resources comprises: transmitting the first assignment of feedback resources and the second assignment of feedback resources on a physical downlink control channel (PDCCH).

22. The method of claim 21, further comprising:

transmitting the first assignment of feedback resources and the second assignment of feedback resources occurs during a control portion of the second TTI.

23. The method of claim 21, further comprising:

transmitting the first assignment of feedback resources and the second assignment of feedback resources occurs during a control portion of a TTI other than the second TTI.

24. The method of claim 13, wherein the wireless node is associated with a priority communication.

25. The method of claim 13, wherein the feedback message comprises an acknowledgement/negative acknowledgement (ACK/NACK) message.

26. An apparatus for wireless communication at a relay wireless node, in a system comprising:

a processor;

memory in electronic communication with the processor; and instructions stored in the memory and operable, when executed by the processor, to cause the apparatus to:

receive, during a first transmit time interval (TTI), a data message to be forwarded to a wireless node;

forward the data message to the wireless node during the first TTI;

receive, during a second TTI, a feedback message from the wireless node; and retransmit the feedback message during the second TTI.

27. The apparatus of claim 26, wherein the instructions are further executable by the processor to:

receive, during the first TTI, an assignment of data resources for forwarding the data message to the wireless node.

28. The apparatus of claim 26, wherein the instructions are further executable by the processor to:

receive, during the second TTI, a first assignment of feedback resources for receiving the feedback message from the wireless node and a second assignment of feedback resources for retransmitting the feedback message.

29. The apparatus of claim 26, wherein the first TTI is a downlink TTI and the second TTI is an uplink TTI.

30. An apparatus for wireless communication, in a system comprising:

a processor;

memory in electronic communication with the processor; and instructions stored in the memory and operable, when executed by the processor, to cause the apparatus to:

transmit, to a relay wireless node during a first transmit time interval (TTI), a data message to be forwarded by the relay wireless node to a destination wireless node during the first TTI;

transmit, to the relay wireless node, a first assignment of feedback resources to allow the relay wireless node to receive a feedback message from the destination wireless node during a second TTI and a second assignment of feedback resources to allow the relay wireless node to retransmit the feedback message during the second TTI; and receive the feedback message from the relay wireless node during the second TTI.

\* \* \* \* \*